Oct. 28, 1969          R. H. STOW                3,475,213
       ELECTRICALLY CONDUCTIVE ADHESIVE TAPE
              Filed Sept. 13, 1965
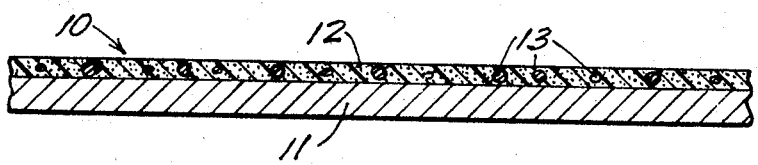
                                    INVENTOR.
                              ROBERT H. STOW
                              BY
                              Carpenter, Kinney & Boulter
                                       ATTORNEYS United States Patent Office 3,475,213
Patented Oct. 28, 1969

3,475,213
ELECTRICALLY CONDUCTIVE ADHESIVE TAPE
Robert H. Stow, White Bear Lake, Minn., assignor to Minnesota Mining and Manufacturing Company, St. Paul, Minn., a corporation of Delaware
Filed Sept. 13, 1965, Ser. No. 486,619
Int. Cl. H01b 1/02; C09j 7/00; B44d 1/18
U.S. Cl. 117—227                    11 Claims

ABSTRACT OF THE DISCLOSURE

A pressure-sensitive adhesive tape that is electrically conductive through the tape, comprising an electrically conductive backing and a layer of pressure-sensitive adhesive material coated on the backing. Electrically conductive particles having a substantial thickness in relation to the average of their length and width, and being only slightly less in thickness than the thickness of the layer of adhesive material are distributed in the layer of adhesive material in a monolayer.

---

This invention is believed to provide the first practical pressure-sensitive adhesive tape or sheet product that is adherable to substrates to provide an electrically conductive path between them. These tapes have "through-the-tape" electrical conductivity. More specifically, this invention provides a tape product comprising an electrically conductive backing carrying a pressure sensitive adhesive layer that will readily conduct an electric current from the substrate to the backing; generally the backing conducts electric current through to the back surface of the tape. These new products exhibit resistances, measured from adhesive surface to back surface, at least less than 100 ohms/square inch and pressure adhesion values at least greater than 10 ounces/inch of width. Preferred products of the invention have much better properties, some of them, even after long aging, exhibiting resistances as low as a few hundredths of an ohm/square inch and pressure adhesion values as high as 30 or 40 or even more ounces/inch of width.

These new products perform admirably as a wrapping material for electrical devices and circuit elements to give electrostatic shielding or to provide an envelope maintained at the ground potential. In addition, the low resistance and high adhesion of these products enables their use as easily and speedily applied durable low voltage conductors; and, in such uses, the products eliminate the necessary for soldered or other types of wire connections. The availability of these new products opens the way to many time and expense saving procedures.

The adhesive film carried by the conductive backing in the novel tape products includes a dispersion of electrically conductive particles. The low resistance and high adhesion requisite to the production of practical and widely usable electrically conductive adhesive tape products has been found to depend critically on the relation between the size, shape, distribution, and amount of these electrically conductive particles and the thickness of the film. Additionally important to the production of usable tape products is the discovery of long-lived, chemically compatible mixtures of preferred conductive particles and adhesive materials as well as of compatible combinations of preferred conductive backings with adhesive materials.

While others have taught the preparation of electrically conductive adhesive tape by dispersing finely divided silver in the adhesive film of the tape (see Coleman et al. 2,808,352), the absence from their teaching of these critical elements prevented them from disclosing products of practical utility. Not until the present invention has there been available a product that is so highly conductive and strongly adhesive and therefore of significant utility.

The products of this invention include a flexible backing of a material having an electrical resistivity of not more than about 1000 ohm-centimeters, preferably not more than about 10 ohm-centimeters. A thin film of a chemically compatible mixture of pressure sensitive adhesive material and electrically conductive particles is applied in electrically conductive relation over at least one surface of the backing. ("Adhesive material" as used hereinafter is distinguished from "adhesive" or "conductive adhesive," the latter referring to the mixture of adhesive material and particles.) The particles in the adhesive film lie essentially in a monolayer and have a substantial thickness in relation to their width and length, this thickness being slightly less than the thickness of the film. Essentially none of the particles extend through the surface of the film. The particles comprise a volume amount between about 0.1 and 40 percent of the volume of adhesive material.

In the drawings, FIGURE 1 is an enlarged section through a tape of this invention. As shown, the tape 10 includes a conductive backing 11 and an adhesive film 12 in which conductive particles 13 are dispersed.

Flexible metal foils are the most typical backing for the tape products of this invention. Of these, soft copper and aluminum foils are very useful in that they are excellent electrical conductors and inexpensive and provide an easily rolled product. Metal coated films are also useful, and when applied to a substrate the film insulates and protects the conductor. Conductive papers and cloths and metallized cloths also find application in producst of this invention. In general, to achieve a product having useful conductivity, the material of the backing should have an electrical resistivity of not more than about 1000 ohm-centimeters.

Any film-forming material capable of the needed pressure sensitive adhesive properties may be used as the adhesive material so long as it is compatible with the material of the backing on which the adhesive is to be coated and with the conductive particles which are to be dispersed in it. Many natural and synthetic polymeric bases are available for pressure sensitive adhesive tapes, including acrylates, polyvinyl ethers, copolymers of polyvinyl acetate, and polyisobutylene, and natural, SBR, neoprene, and silicone rubbers. The principles of conductive particle distribution, size, and amount apply irrespective of the kind of adhesive material, though a more insulative adhesive material may require that the covering of material on the particles be reduced in thickness.

Particles useful in the invention typically take the form of spheres or granules and, in general, it can be said, most of the particles should have a substantial thickness in relation to their length and width (that is, their thickness or height should be at least about 25 percent of the average of their length and width). It has been found that the incorporation in an adhesive film of electrically conductive particles that have a substantial thickness slightly less than the thickness of the adhesive film, and which are distributed essentially in a monolayer rather uniformly in the film, results in reducing the electrical resistance of the adhesive to useful proportions. For a particular size of particle there is an optimum adhesive coating thickness at which adhesion is strong and electrical resistance low. It is theorized that the adhesive material rapidly undergoes a breakdown in areas immediately above the large particles to provide electrically conductive paths in combination with the particle itself. If the particles are too small, the thickness of adhesive covering them becomes too great for the rapid, low-voltage breakdown needed in a useful product.

In measuring the resistance through a tape product, I have used a test method that approximates the conditions that will occur in actual job applications. In this method, the tape is laid on a one square inch brass electrode, adhesive side up, and a second one square inch brass electrode then laid on the adhesive side of the tape in alignment with the first electrode. A weight is applied to the top electrode sufficient to produce a pressure of 5 pounds/ square inch. A power supply is connected across the electrodes, and a rheostat in the circuit adjusted so that the power supply delivers 0.1 ampere. A voltmeter, also connected across the electrodes measures the voltage drop, from which the resistance is calculated.

Using this test method, it has been found that when the adhesive material over the particles is much more than about 2.5 mils, consistently low resistances are not obtained. Preferably the thickness of adhesive material over the particles is not greater than 0.5 mil. Particles having a thickness that is less than the adhesive film thickness by not more than 2.5 mils, and preferably by not more than about 0.5 mil, should be included in a volume amount of at least 0.1 percent, preferably at least 1 percent, of volume of adhesive material to obtain satisfactorily low resistance. On the other hand, essentially none of the particles should extend above the surface of the adhesive to preserve satisfactory adhesion values.

It will be understood that the particles vary in size. Not all the particles are of the maximum thickness slightly less than the thickness of the adhesive, and it is believed that not all of the particles participate in passing an applied current. I obtain preferred results by using particles of approximately the same thickness. For that reason, by one procedure, I screen a batch of particles with two different screens, eliminating the particles not passed by the larger mesh screen as well as those passed by the smaller mesh screen. Desirably, the particles do not vary in diameter by more than a mil, preferably by less than 0.5 mil. Usually, 325 to 400 mesh Taylor screens (325 and 400 meshes/inch) are used.

It has been found that further improvements in the conductivity of the tape products of the invention are achieved by starting with particles having a size range that extends beyond the proposed thickness of the adhesive layer, and then passing the particles in a vehlice through a device such as a paint mill to flatten the particles of larger diameter to appropriate thickness. When a tape product having an adhesive layer including such particles is placed under a microscope, it is found that the particles are in a monolayer with the particles substantially lying on their flattened side. This method is believed to achieve preferred results because a larger number of particles are at the maximum thickness.

If flattened particles of the proper size are too numerous, so that particles overlap at points, and for that reason extend above the surface of the adhesive coating, adhesion will also be too low. It has been found that for this reason the volume amount of flattened particles should not be much more than about 15 percent of the amount of adhesive material. On the other hand, the volume amount of substantially spherical particles may be greater, but not more than about 40 percent of the volume of adhesive material for a product of useful conductivity. Preferred results are obtained when the volume amount of particles is between about 1 and 8 percent of the volume of adhesive material.

Metal particles are the most commonly used electrically conductive particles in products of the invention, and, of these, copper is preferred because it gives high conductivity and is inexpensive. Though copper catalyzes the degradation of most adhesive polymers over a period of time, and changes their adhesive and cohesive properties, I have obtained long-lived compatible mixtures of adhesive material and particles in tape products through incorporation in the adhesive material of antioxidants and chelating-type inhibitors. It is known that antioxidants or chelating agents do not separately prevent the catalytic activity of copper on adhesive polymers. However, I have surprisingly found that a combination of antioxidant and chelating agent, when included in a pressure sensitive adhesive that includes copper particles and is coated on a conductive backing, produces a chemically stable adhesive with the result that the tape product has good aging properties. In general, the combination of antioxidant and chelating agent in an adhesive material makes possible a compatible mixture of that adhesive material with any oxidizable base metal (the term base metal, as used herein, excludes alkaline earth and alkali metals). As little antioxidant as .05 weight parts per 100 parts adhesive material and as little chelating agent as .1 weight parts per 100 parts adhesive material accomplishes useful results. Adhesive properties deteriorate when the antioxidant and chelating agents are used in excess of 5 weight parts per 100 parts adhesive material. Preferable ranges are 0.5 to 2 and 0.5 to 3 weight parts per 100 parts adhesive material for the antioxidant and chelating agent, respectively. Dibetanaphthyl-p-phenylenediamine (Agerite White), 4,4-thiobis(6-tert-butyl metacresol) (Santonox R), and 3,5-ditert-butyl-4-hydroxybenzyl ether (Ionox 201) have been found useful as antioxidants, while disalicylalpropylene diamine (Copper Inhibitor 50) and N,N-bis(salicyclidiene-2-aminoethyl)aniline (Chel SAA) have been found useful as inhibitors. In addition to copper, aluminum is a preferred metal for use in electrically conductive adhesive tape products, and, as noted above, combinations of anti-oxidant and inhibitor are desirable in products using aluminum foil as a backing or aluminum particles in the adhesive coating.

Metal particles, beside copper and aluminum particles, that may be used include antimony, bismuth, cadmium, chromium, cobalt, iron, lead, mercury amalgams, manganese, molybdenum, nickel, tin, titanium, tungsten, and zinc particles. Metallized plastic or glass beads or spheres also produce useful products, as do metal patties. The particles can be metal alloys, or composites in which one metal is coated on another, and different kinds of particles can be mixed in one adhesive film. In addition, particles or hollow spheres of graphite produce tapes of usefully low resistance.

The invention is further described in the following examples:

EXAMPLE 1

An adhesive copolymer of 96 percent isooctylacrylate and 4 percent acrylamide was diluted to 17.6 percent solids in ethyl acetate and 2544 grams of the material mixed with 191 grams of spherical silver powder passed through a 200 mesh screen (200 meshes per inch) but held back by a 325 mesh screen. One portion of this mixture was separated and labeled sample A. To a second portion of the mixture, labeled sample B, 2.4 grams each of Copper Inhibitor 50, Agerite White, Santonox R, and Ionox 201 were added. Both mixtures were milled on a paint mill on which the orifice between the last pair of rollers was set at 1.4 mils. Before each addition of it to the mill, the mixture was stirred vigorously scraping the bottom of the container with a spatula.

Because the mill orifice tends to increase as the particles are milled, depending on the amount of metal in the adhesive, the ductility of the metal, and the mill characteristics, the thickness of the larger particles will be larger than the original orifice setting. For this reason, the milled adhesive was trial coated in several batches on 2 mil soft aluminum foil using a knife coater set at a different orifice for each batch. The adhesion and caliper were tested by the ASTM D1000 method. These tapes were dried 2.5 minutes at 125° F. and 2.5 minutes at 210° F. The following properties were measured:

| | Adhesive Caliper (mils) | Adhesion/ inch of width (ounces) | Resistance (ohms/ square inch) |
|---|---|---|---|
| Coating Orifice (mils): | | | |
| 9 | 1.7 | 7 | .069 |
| 11 | 1.8 | 17 | .10 |
| 13 | 2.0 | 31 | .13 |
| 15 | 2.3 | 42 | .21 |
| 18 | 2.7 | 42 | .43 |
| 21 | 3.2 | 46 | .76 |

Based on these trials, an orifice of 14 mils on the knife coater was selected because this gave a good combination of low resistance with good adhesion. (The maximum particle size was estimated at about 2.0 mils.) Samples A and B of the adhesive were each knife coated on soft 2 mil aluminum foil using this orifice. Before each increment was added to the hopper the mixtures were hand stirred vigorously, scraping the bottom of the container to mix in any metal which might have settled. The two kinds of coated foil were each dried 2.5 minutes at 150° F. and 2.5 minutes at 220° F. and a silicone treated glassine paper liner then wound into the finished tape. This tape, including the liner, was slit in one inch widths. The liner was left in the rolls during aging, and removed before testing. Microscopic examination of the tape showed that some of the spheres were flattened and coin shaped and that all of them were lying on a flat side.

| | A | B |
|---|---|---|
| Adhesion/inch of width (ounces):[1] | | |
| Fresh | 41 | 41 |
| After 16 hours at 113° C | 23 | 36 |
| After 24 hours at 113° C | 20 | 34 |
| Resistance through tape (ohms/square inch): | | |
| Fresh | .082 | .077 |
| 16 hours at 113° C | .30 | .087 |
| 24 hours at 113° C | .31 | .16 |

[1] Tested by method described in ASTM D1000.

The low resistance of these samples as compared to those exhibited by the trial coatings is a reflection of better mixing during coating whereby the particles were more evenly distributed into all the tapes coated.

EXAMPLE 2

Two batches of adhesive mixture were prepared. In batch A 300 grams of the adhesive material of Example 1, diluted to 21.8 percent solids, were mixed with 74 grams of spherical silver cut by 200 and 325 mesh screens. In batch B 1240 grams of the same adhesive material diluted to 21.8 percent solids were added to 6.75 grams of Santonox R and 2.25 grams of Copper Inhibitor 50. Batch A was passed to a paint mill from automatic mixing equipment that included:

(1) A cone shaped tank.

(2) A pump arranged to remove adhesive from the bottom (narrow) end of the tank.

(3) A recycle tube leading from the pump and opening into the top of the tank.

(4) A feed tube, with valve to control flow rate, leading from the recycle tube to the first nip of the paint mill.

Part A was thoroughly mixed and poured into the tank. The pump was started and recycling continued 2 minutes. The mill, in which the orifice between the first two rolls was set at two mils and that between the last two rolls was set at one mil, was turned on and part A was supplied to it and milled. After the milling operation, parts A and B were combined in a mixture in which the ingredients had a weight ratio one to the other of 100 parts adhesive solids, 21.8 parts silver, 2.62 parts Santonox R, and .67 part Copper Inhibitor 50.

The combined mixture was test coated as in Example 1 and a coating orifice of 9 mils selected. The adhesive was coated using this orifice on one-ounce dead soft rolled copper. A backsize, which had previously been prepared, using 300 grams of a hydroxy terminated siloxane polymer containing silanic hydrogen (Syl-off 23), 3.6 grams of lead octoate solution including 24 weight percent lead (Silicure L-24), and 2400 grams toluene was coated at the same time on the back surface of the copper foil, and the coated web was dried for 2.5 minutes at 150° F. and 2.5 minutes at 240° F. The finished tape was wound in a roll in one inch widths. The tape was then tested to give the following data:

| | Fresh | After 7 days at 135° C. |
|---|---|---|
| Adhesion/inch of width (ounces) | 41 | 31 |
| Resistance (ohms/square inch) | .023 | .041 |

The tape was easily unwound after aging.

EXAMPLE 3

An adhesive like that of Example 2, except that 50 grams of spherical copper cut from a commercial lot by 325 and 200 mesh screens replaced the silver, was prepared and coated as described in that example. When tested, this tape gave the following data:

| | Fresh | After 7 days at 135° C. |
|---|---|---|
| Adhesion/inch of width (ounces) | 42 | 31 |
| Resistance (ohms/square inch) | .033 | .034 |

EXAMPLE 4

An adhesive mixture was prepared using, in parts by weight, 500 parts of the base adhesive material of Example 1 (about 20 percent solids), 27 parts spherical copper cut from a commercial lot by 325 and 400 mesh screens, 3 parts Santonox R, and 1 part Copper Inhibitor 50. This adhesive mixture was mixed but not milled. After trial coating it was coated on 2 mil aluminum foil, using an orifice of 10 mils. The same backsize was used as in Example 2. This tape was dried 2.5 minutes at 125° F. and 2.5 minutes at 240° F. After slitting in one inch widths the tape was tested as follows:

| | Fresh | After 7 days at 135° C. |
|---|---|---|
| Adhesion/inch of width (ounces) | 46 | 37 |
| Resistance (ohms/square inch) | .12 | 1.4 |

EXAMPLES 5-8

In these examples different kinds of adhesive materials and conductive particles were used. In Example 8 the adhesive mixture was milled by the method described in Example 1. All of the adhesive mixtures were coated on 2 mil soft aluminum foil using the coating procedures, including a trial coating, as descirbed in Example 1. The same liner was used as in Example 1, and the tape was slit in one inch widths.

| | Example | | | |
|---|---|---|---|---|
| | 5 | 6 | 7 | 8 |
| Adhesive formula (parts by weight) | Adhesive material of Example 1 | 100 med. molecular wt. polyisobutylene (Vistanex L-120); 70 polybutene liquid synthetic rubber made by polymerizing normal and branched chain butene; mol. wt. about 1,200 (Oronite #32)..1 2,5-di-tert.-amylhydroquinone (Santovar A); 30 Hydrogenated methyl ester of rosin (Hercolyn); 45 Resin made by polymerizing terpene (mostly beta-pinene) (Piccolyte S-85). | 100 high viscosity poly (vinyl ethyl ether) (EDBM); 15 phenol modified alpha pinene resin (Newport S); 2 Santovar A. | 100 natural rubber; 75 polyterpene resin (Piccolyte S-115); 2 Santovar A. |
| Conductive particles | Graphite | Nickel | Tin | Aluminum. |
| Shape | Hollow spheres | Spheres | Granules | Spheres (milled). |
| Mesh number of screens used to separate particles | 325-400 | 325-400 | 325-400 | 100-325 (before milling). |
| Parts in weight per 100 parts adhesive | 2 | 34 | 7 | 10.8. |
| Coating orifice (mils) | 16 | 12 | 13 | 18. |
| Adhesion/inch of width (ounces) (fresh) | 39 | 42 | 54 | 35. |
| Resistance (ohms/square inch) (fresh) | 11.1 | .28 | .11 | 1.5. |

EXAMPLE 9

An adhesive mixture using 2544 grams of the adhesive material of Example 1 (17.6 percent solids) and 191 grams of spherical silver cut from a commercial lot by 200 and 325 mesh screens was prepared and milled as in Example 1. Trial coating showed that an orifice of 13 mils gave the best combination of resistance and adhesion. This adhesive was coated on the aluminum side of a one-mil Mylar polyester film which had been coated with about 280 angstroms of aluminum by vapor deposition in a high vacuum. After drying 2.5 minutes at 125° F. and 2.5 minutes at 220° F., this tape was wound with the same liner as in Example 1 and the tape slit in one inch widths. The liner was removed before the following tests on the fresh tape:

Adhesion/inch of width (ounces) _____ 25
Resistance through tape (ohms/square inch) __ 20,000+

Resistance along the tape was measured on the adhesive side with probes.

Distance between probes (inches) _____ .5    5.0
Resistance (ohms) _____ 3.5    8.5

This tape did not conduct electricity through the tape but did conduct electricity from point to point on the adhesive side. Since the resistance of the thin aluminum layer was substantial in relation to the adhesive resistance, resistance gradually increased as the distance between probes increased.

EXAMPLE 10

An adhesive mixture was prepared using, in parts by weight, 500 parts of the base adhesive material of Example 1 (about 20 percent solids), 40 parts spherical silver powder cut from a commercial lot by 200 and 325 mesh screens, 3 parts Santonox R, and 1 part Copper Inhibitor 50. The silver powder was added to ⅕ of the adhesive material. This was hand mixed as in Example 1 and passed through a three roll paint mill with the last nip set at 1.5 mils. The milled adhesive mixture was then mixed with the rest of the adhesive material, including the other ingredients. Trial coating showed that good adhesion and low resistance were obtained by coating with an orifice of 13 mils.

This adhesive was then coated, with vigorous mixing, on a silicone treated glassine paper with an orifice of 13 mils, and the coated paper was dried 2.5 minutes at 125° F. and 25 minutes at 240° F. After drying, this coated paper was wound up with a carbonaceous conductive cloth (Pluton) having an electrical resistivity of about .05 ohm-centimeter. After slitting in one inch widths, the silicone treated paper was easily removed leaving a combination of conductive cloth and adhesive which was then tested with the following results:

Adhesion/inch of width (fresh) (ounces) _____ 26
Resistance through tape (fresh) (ohms/square inch) _____ 15.1

EXAMPLE 11

The same adhesive-particle mixture as prepared in Example 10 was coated as described there on silicone treated glassine paper. After drying, the coated paper was laminated to conductive paper made as follows: 10 weight percent of fiber made by beating the cloth of Example 10 was combined with 90 weight percent wood pulp in a slurry in water. This mixture was converted to flat paper on a Fourdrinier papermaking machine, this paper having an apparent electrical resistivity of 1.5 ohm-centimeters. After the tape was slit, the liner was removed, and the remaining tape was tested as follows:

Adhesion/inch of width (ounces) _____ 58
Resistance through tape (ohms/square inch) _____ 2.1

I claim:
1. An electrically conductive pressure-sensitive-adhesive tape comprising a flexible backing that comprises an electrically conductive layer of material having an electrical resistivity of not more than about 1000 ohm-centimeters, and a thin film of a chemically compatible mixture of pressure-sensitive-adhesive material and electrically conductive particles applied in electrically conductive relation over said layer, said particles lying essentially in a monolayer and having a substantial thickness in relation to the average of their length and width, the thickness of the particles being between 0 and 2.5 mils less than the thickness of the film, and said particles having a volume amount between about 0.1 and 40 percent of the volume of adhesive material.

2. The tape product of claim 1 in which the conductive particles include particles that have a thickness that is less than the thickness of the adhesive film by not more than 0.5 mil, said particles being included in a volume amount at least 0.1 percent of the volume of adhesive material.

3. The tape product of claim 1 in which the conductive particles are selected from base metal particles.

4. The tape product of claim 1 in which the conductive particles are selected from base metal particles, and the adhesive includes at least one antioxidant and at least one chelating agent.

5. The tape product of claim 3 in which the conductive particles are selected from copper and aluminum particles.

6. The tape product of claim 1 in which the conductive particles are graphite particles.

7. The tape product of claim 1 in which the particles have a volume amount between about 1 and 8 percent of the volume of adhesive.

8. The tape product of claim 1 in which the conductive particles include particles that have been mechanically flattened to increase the number of particles of maximum thickness.

9. An electrically conductive pressure-sensitive-adhesive tape comprising a flexible backing of a material selected from copper and aluminum, a thin film of a chemically compatible mixture of a pressure-sensitive-adhesive material that includes at least principally an acrylate-based synthetic polymeric material and electrically conductive particles applied in electrically conductive relation over at least one surface of the backing, said particles being selected from copper and aluminum particles that have a substantial thickness in relation to the average of their length and width, said particles lying essentially in a monolayer and the thickness of the largest particles being between about 0 and 0.5 mil less than the thickness of the film, essentially none of the particles extending through the surface of the adhesive film, and said particles having a volume amount between about 1 and 40 percent of the volume of adhesive.

10. A process for preparing an electrically conductive pressure-sensitive-adhesive tape including the steps of screening a batch of electrically conductive particles that have a substantial thickness in relation to the average of their length and width to eliminate particles too large to pass the screening process, screening the particles a second time to eliminate particles passed by the screening process, adding the particles not passed by the second screening process to a liquid mixture of pressure-sensitive-adhesive material that is chemically compatible with the particles, and coating the adhesive mixture in electrically conductive relation over at least one surface of a flexible backing that comprises an electrically conductive layer of material having an electrical resistivity of not more than about 1000 ohm-centimeters, said coating being applied in an amount such that the thickness of the adhesive film when dry on the backing is greater than the thickness of the particles by not more than 2.5 mils.

11. The process claim 10 in which at least the largest of the particles passed by the screening process are mechanically flattened in a step prior to coating the adhesive-particle mixture.

References Cited

UNITED STATES PATENTS

| | | | |
|---|---|---|---|
| 2,498,493 | 2/1950 | Hickernell | 117—122 X |
| 2,808,352 | 10/1957 | Coleman et al. | 117—122 X |
| 3,030,237 | 4/1962 | Price | 117—227 |
| 3,052,573 | 9/1962 | Dumesnil | 117—227 X |
| 3,211,584 | 10/1965 | Ehrreich | 117—227 |
| 3,278,455 | 10/1966 | Feather | 117—227 X |

WILLIAM L. JARVIS, Primary Examiner

U.S. Cl. X.R.

117—122, 135.1, 68.5, 226; 162—138